US012646645B2

(12) United States Patent
Woerner et al.

(10) Patent No.: US 12,646,645 B2
(45) Date of Patent: Jun. 2, 2026

(54) ELECTROMAGNETIC DEVICE, AND METHOD FOR PRODUCING AN ELECTROMAGNETIC DEVICE OF THIS KIND

(71) Applicant: Knorr-Bremse Systeme Fuer Nutzfahrzeuge GmbH, Munich (DE)

(72) Inventors: Ralf Woerner, Tiefenbronn (DE); Friedbert Roether, Cleebronn (DE); Benjamin Jensen, Grossbottwar (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 246 days.

(21) Appl. No.: 18/715,093

(22) PCT Filed: Dec. 14, 2022

(86) PCT No.: PCT/EP2022/085852
§ 371 (c)(1),
(2) Date: May 30, 2024

(87) PCT Pub. No.: WO2023/111019
PCT Pub. Date: Jun. 22, 2023

(65) Prior Publication Data

US 2025/0029763 A1 Jan. 23, 2025

(30) Foreign Application Priority Data

Dec. 15, 2021 (DE) ..................... 10 2021 133 235.4

(51) Int. Cl.
*H01F 7/08* (2006.01)
*H01F 7/16* (2006.01)
(Continued)

(52) U.S. Cl.
CPC ........... *H01F 7/081* (2013.01); *H01F 7/1607* (2013.01); *H01F 27/24* (2013.01); *H01F 27/306* (2013.01)

(58) Field of Classification Search
CPC ........ H01F 7/081; H01F 7/1607; H01F 27/24; H01F 27/306; H01F 7/127; H01F 7/128;
(Continued)

(56) References Cited

U.S. PATENT DOCUMENTS

2018/0247749 A1 8/2018 Schonlau et al.
2020/0238967 A1 * 7/2020 Zhang .................. B60T 17/221

FOREIGN PATENT DOCUMENTS

CN 102057451 A * 5/2011 ............. H01F 7/127
DE 10154257 A1 2/2003
(Continued)

OTHER PUBLICATIONS

International Search Report for PCT/EP2022/085852, Issued Mar. 22, 2023.

*Primary Examiner* — Mohamad A Musleh
(74) *Attorney, Agent, or Firm* — NORTON ROSE FULBRIGHT US LLP

(57) ABSTRACT

An electromagnetic device including: a magnetic core with a longitudinal axis, which magnetic core has a first region and a second region; a coil body arranged circumferentially around the second region of the magnetic core and has at least one receiving region for receiving at least one coil winding of a coil; and a housing made of a magnetic material, which housing circumferentially surrounds the magnetic core and the coil body and has at least one contact region in which the housing surrounds/contacts the magnetic core. The first region of the magnetic core has at least one bulge on a surface of the magnetic core facing the contact region of the housing, the bulge being configured such that the magnetic core does not contact the housing in a portion
(Continued)

along the longitudinal axis between the bulge and the second region.

15 Claims, 2 Drawing Sheets

(51) Int. Cl.
*H01F 27/24* (2006.01)
*H01F 27/30* (2006.01)

(58) Field of Classification Search
CPC ........ H01F 7/14; H01F 2007/083; B60T 8/36; B60T 13/68; B60T 15/02
See application file for complete search history.

(56) References Cited

FOREIGN PATENT DOCUMENTS

| | | | | |
|---|---|---|---|---|
| DE | 10300414 | A1 | | 3/2004 |
| DE | 102006019464 | A1 | | 9/2007 |
| DE | 102014115206 | B3 | | 2/2016 |
| DE | 102014115207 | A1 | | 4/2016 |
| DE | 102018123997 | A1 | | 4/2020 |
| EP | 3222897 | B1 | | 10/2018 |
| JP | H0463755 | A | * | 2/1992 |
| KR | 20210064376 | A | | 6/2021 |

* cited by examiner

ELECTROMAGNETIC DEVICE, AND METHOD FOR PRODUCING AN ELECTROMAGNETIC DEVICE OF THIS KIND

FIELD OF THE INVENTION

The present invention relates to an electromagnetic device comprising a magnetic core, a coil body which is arranged circumferentially around the magnetic core and a housing, and a method for producing an electromagnetic device of this kind.

BACKGROUND INFORMATION

Such electromagnetic devices are used, for example, in electromagnetic actuators, wherein electromagnetic actuators are known, for example, in the form of electromagnetic switching devices or valve devices such as in the form of an electromagnetic relay or solenoid valve. Solenoid valves, namely in the form of tilting armature valves, are used for example as control valves for regulating the pressure of air, namely in a vehicle such as for example in a utility vehicle or a bus for passenger conveyance. For example, a brake system for a vehicle with an electronic service brake system comprises at least one control valve for regulating the pressure.

An electromagnetic actuator in the form of a tilting armature valve which has an electromagnetic device is discussed, for example, in DE 10 2016 105 532 A1. The electromagnetic actuator has an electromagnetic device which comprises a magnetic core and a coil body arranged around said core.

Further configurations of solenoid valves are understood, as discussed in DE 10 2014 115 207 A1, DE 10 2018 123 997 A1 or DE 10 2014 115 206 B3, for example.

Generally in electromagnetic devices the magnetic core is pressed or welded in the housing in order to produce a connection between the magnetic core and housing. A magnetic resistance which is as low as possible can be achieved by this method, by avoiding a gap at the transition from the magnetic core to the housing or yoke. The spacing and the position of the magnetic core from the housing generally have a significant effect on a magnetic force to be generated.

In the previously understood production methods the magnetic core, the body and the housing generally have to be produced with a high level of manufacturing accuracy, in order to achieve a central orientation of the coil and magnetic core to the housing and by which an oblique position of the magnetic core to the housing is configured to be avoided. Such an oblique position causes greater electromagnetic losses, whereby the efficiency is reduced and the spread of functional parameters over production is increased. Due to the required high manufacturing accuracy, conventionally produced electromagnetic devices often have greater electromagnetic losses, whereby the efficiency of the electromagnetic devices thus produced is reduced. Moreover, the known production variants are complicated and time-consuming since they require a very accurate machining of the individual parts of an electromagnetic device.

SUMMARY OF THE INVENTION

An object of the present invention, therefore, is to specify an electromagnetic device of the type mentioned in the introduction which can be produced relatively simply and with manufacturing tolerances at a lower level and which, considered relative to a plurality of devices to be produced, delivers substantially uniform magnetic characteristic values.

The invention relates to an electromagnetic device of the type mentioned in the introduction according to the accompanying claims. Advantageous embodiments and developments of the invention are specified in the dependent claims and the following description.

In particular, one aspect of the present invention relates to an electromagnetic device comprising a magnetic core with a longitudinal axis, which magnetic core has a first region and a second region, a coil body which is arranged circumferentially around the second region of the magnetic core and has at least one receiving region for receiving at least one coil winding of a coil, and a housing made of a magnetic material, which at least partially circumferentially surrounds the magnetic core and the coil body and has at least one contact region in which the housing surrounds and contacts the magnetic core. The first region of the magnetic core has at least one bulge on a surface of the magnetic core facing the contact region of the housing. The magnetic core in the region of the bulge contacts the contact region of the housing, wherein the bulge is configured such that the magnetic core does not contact the housing in a portion along the longitudinal axis between the bulge and the second region.

The electromagnetic device according to the invention permits a rapid and reliable centering of the magnetic core in the housing, since the magnetic core can be relatively easily centered by the housing and by the coil body. Due to such a centering, the orientation of the components to one another can be improved and thereby electromagnetic losses kept at a lower level, in particular in comparison with known electromagnetic devices which are produced as described above. This also means that the electromagnetic device according to the invention has a high level of efficiency.

The invention also enables the electromagnetic device to be produced simply and with lower manufacturing tolerances, by the bulge of the magnetic core permitting a simple centering of the magnetic core in the housing. Thus the positional tolerance of the magnetic core is reduced to a minimum and guarantees substantially uniform magnetic characteristic values over a plurality of devices to be produced. In other words, this means that the device according to the invention permits more uniform magnetic properties, even when manufacturing tolerances are set to a lower level than in conventional electromagnetic devices. Due to the manufacturing tolerances at a low level, the production methods for these individual parts are also more economical than for individual parts of conventional electromagnetic devices.

Moreover, this embodiment of the electromagnetic device enables the magnetic core to be pushed into the housing in the longitudinal direction by a small expenditure of force compared to conventional production methods and provides in a simple manner a gap-free connection between the magnetic core and the housing. The bulge enables a type of flow behavior of the housing, in particular of the housing material, to be produced during the pressing-in, which reduces the required pressing-in force for pressing the magnetic core into the housing and at the same time permits an angular offset between the housing and the longitudinal axis of the magnetic core, since the magnetic core is not in contact with the housing in a portion along the longitudinal axis between the bulge and the second region with the surrounding coil body and thus a clearance is present for an angular offset between the housing and magnetic core.

The device according to the invention can be used, in principle, in many types of electromagnetic devices which have a magnetic core and a housing, and in which an accurate orientation of the magnetic core is important.

The electromagnetic device according to the invention can in principle not only be used in electromagnetic actuators, such as for example a solenoid valve, and electromagnets but also in electrical relays. The electromagnetic device according to the invention may be used in a solenoid valve, which may be a tilting armature valve, in a brake system of a vehicle, in particular a utility vehicle.

According to one embodiment of the electromagnetic device, the housing contacts the coil body and exerts a force onto the coil body in a direction transversely to the longitudinal axis of the magnetic core. The contact of the coil body with the housing is advantageous such that the magnetic core which is arranged in the coil body is centered thereby in the housing. This permits a simple and rapid centering of the magnetic core, whereby the electromagnetic device has uniform magnetic properties.

According to one embodiment of the electromagnetic device, the receiving region is formed by at least one wall which has a first region which runs in the direction of the longitudinal axis of the magnetic core and at least one second region which runs transversely to the longitudinal axis of the magnetic core, wherein the housing contacts the second region of the wall. The contact of the second region with the housing enables a centering of the coil body in the housing in a simple manner, whereby the centering of the magnetic core in the housing is also made possible. The central orientation of the magnetic core in the housing permits the production of an electromagnetic device with uniform magnetic properties.

According to one embodiment of the electromagnetic device, the housing has an opening with a longitudinal extent along the magnetic core and with a longitudinal axis. The opening surrounds the magnetic core in the contact region of the housing, and the longitudinal axis of the magnetic core is arranged with an angular offset relative to the longitudinal axis of the opening. A gap between the housing and the magnetic core can be reliably avoided by the cooperation of the configuration of the opening of the housing and the bulge of the magnetic core. This gap-free embodiment results in uniform magnetic properties for the electromagnetic device. A certain angular offset of the longitudinal axis of the opening and the longitudinal axis of the magnetic core with the bulge is also made possible and at the same time a gap-free contact between the housing and the magnetic core is ensured. In other words, this enables an angular offset of a bore axis of the opening, which represents the longitudinal axis of the opening, and the magnetic core longitudinal axis.

According to one embodiment of the electromagnetic device, the bulge is configured spherically on the surface of the magnetic core facing the contact region of the housing. Advantageously a convex press-in zone which can be pressed into the housing is produced by the bulge, in particular by the spherical bulge. When pressing the magnetic core into the housing, the spherical bulge enables a type of flow behavior of the housing, in particular of the housing material, to be produced in order to reduce the required pressing-in force. An angular offset of a longitudinal axis of the housing opening or bore (bore axis) in the contact region of the housing relative to the magnetic core longitudinal axis is also made possible in order to achieve an orientation of the magnetic core in the housing which is as accurate as possible in the course of production. The spherical configuration in this context is an advantageous embodiment of the bulge, since it permits an angular offset and compensation in the three-dimensional direction.

The housing of the electromagnetic device comprises a magnetic material. The housing can primarily comprise a magnetic material. The housing can also be constructed entirely from a magnetic material.

According to one embodiment of the electromagnetic device, the magnetic core is configured rotationally symmetrically in the first and second region. This permits a rapid and reproducible production of the magnetic core.

According to one embodiment of the electromagnetic device, the bulge has a maximum external diameter which is larger than an external diameter of the magnetic core in the second region. In a region with this maximum diameter, the magnetic core contacts the housing directly or without a gap and in spite of higher manufacturing tolerances permits the magnetic core to be oriented centrally in the housing by a corresponding pivoting movement on the bulge, without the gap-free contact being impaired. Moreover, this embodiment enables the magnetic core to be centered rapidly and reliably in the housing, in particular by the coil body, since the magnetic core can be pivoted about the bulge in the housing without the housing or the magnetic core having to be post-treated.

According to one embodiment of the electromagnetic device, the magnetic core is configured cylindrically in the second region. This embodiment enables the magnetic core to be pushed rapidly and simply into the coil body. The same also naturally applies when the coil body is pushed onto the magnetic core. In order to avoid repetition, the pushing of the magnetic core into the coil body equates to the pushing of the coil body onto the magnetic core.

According to one embodiment of the electromagnetic device, the coil body material comprises a plastics material. A coil body having such a coil body material is advantageous and simple in terms of production. The coil body can, however, also be formed entirely from a plastics material, in particular a thermoplastics material.

According to one embodiment of the electromagnetic device, the electromagnetic device is configured as an electromagnetic actuator. This is an advantageous application of the electromagnetic device according to the invention.

According to one embodiment of the electromagnetic device, the electromagnetic device, which is configured as an electromagnetic actuator, has a movable magnetic armature body as a movable actuator element which can be moved by a magnetic field brought about by a flow of current through the coil and the magnetic core. This enables a reliable switching of an electromagnetic actuator. A centered orientation of the magnetic core relative to the armature body is also possible, so that a magnetic field guidance as intended between the magnetic core and armature body and the movement of the armature body are made possible so that this armature body can correctly fulfill its function.

According to one embodiment of the electromagnetic device which is configured as an electromagnetic actuator, the armature body is mounted on the coil body or on the housing.

According to one embodiment of the electromagnetic device, the electromagnetic device is configured as an electromagnetic switching valve or valve device with a movable magnetic armature body as a switching element or valve element which can be moved by a magnetic field brought about by a flow of current through the coil and the magnetic core.

According to one embodiment, the electromagnetic device is configured as an electromechanical relay or solenoid valve.

According to one embodiment, the electromagnetic device is configured as a solenoid valve for a pressure control module or air treatment of a vehicle.

A further aspect of the present invention relates to a method for producing an electromagnetic device according to the invention, which has the following steps:

pre-mounting the coil body and the magnetic core to form an arrangement, mounting the arrangement consisting of the coil body and the magnetic core in the housing, centering the magnetic core during the mounting of the arrangement in the housing by a pivoting movement of the first region of the magnetic core in relation to the contact region of the housing transversely to the longitudinal axis of the magnetic core, and fixing the arrangement consisting of the coil body and the magnetic core in the housing.

The embodiments and advantages mentioned in connection with the electromagnetic device also relate to the method according to the invention. These are not reproduced in order to avoid repetition.

According to one embodiment of the method, the coil body has a magnetic core receiving space into which the magnetic core is inserted.

According to one embodiment of the method, the method can comprise the method step of orientating the magnetic core relative to the magnetic core receiving space in the coil body, so that the longitudinal axis of the magnetic core and a longitudinal axis of the magnetic core receiving space are aligned with one another.

The embodiments described herein can be used side-by-side or also in any combination with one another.

The invention is described hereinafter with reference to the figures shown in the drawing.

DETAILED DESCRIPTION

Figure 1A:
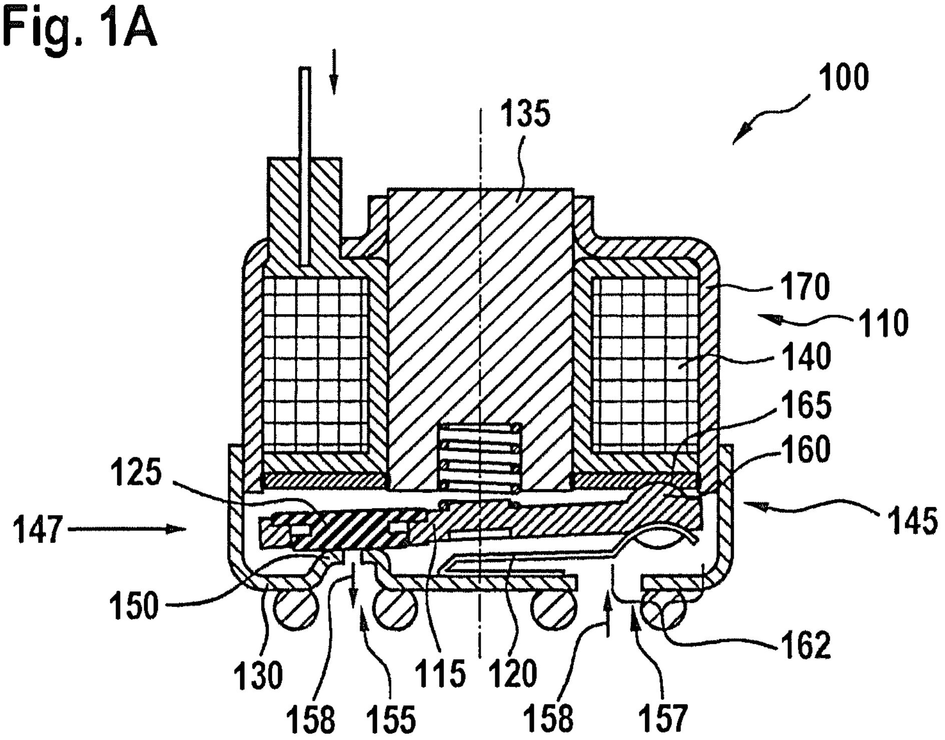
FIG. 1A shows a schematic cross-sectional view of an exemplary tilting armature valve in which an electromagnetic device according to the invention, as shown in FIG. 2, can be used in principle.
Figure 1B:
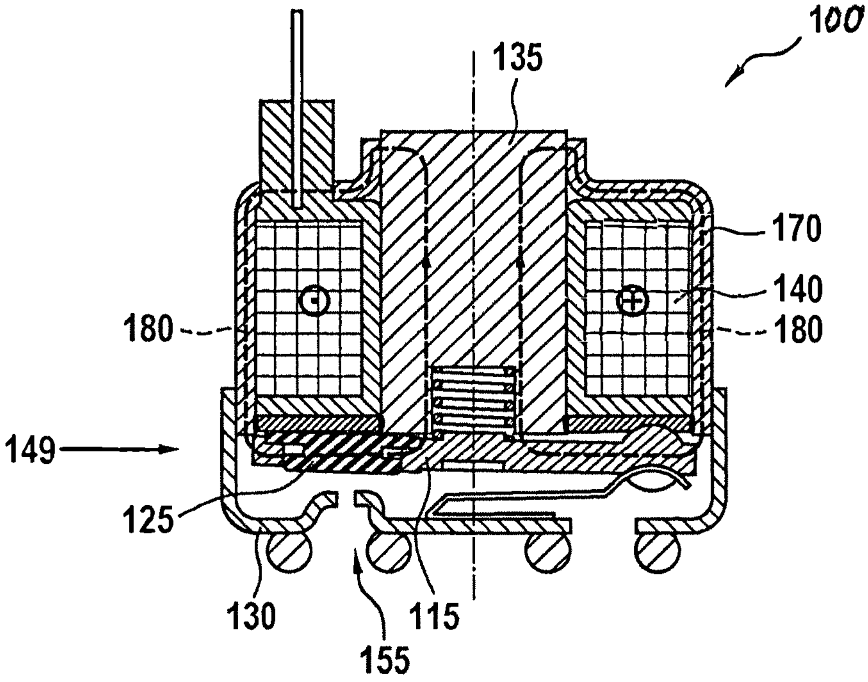
FIG. 1B shows a schematic cross-sectional view of an exemplary tilting armature valve in which an electromagnetic device according to the invention, as shown in FIG. 2, can be used in principle.
Figure 2:
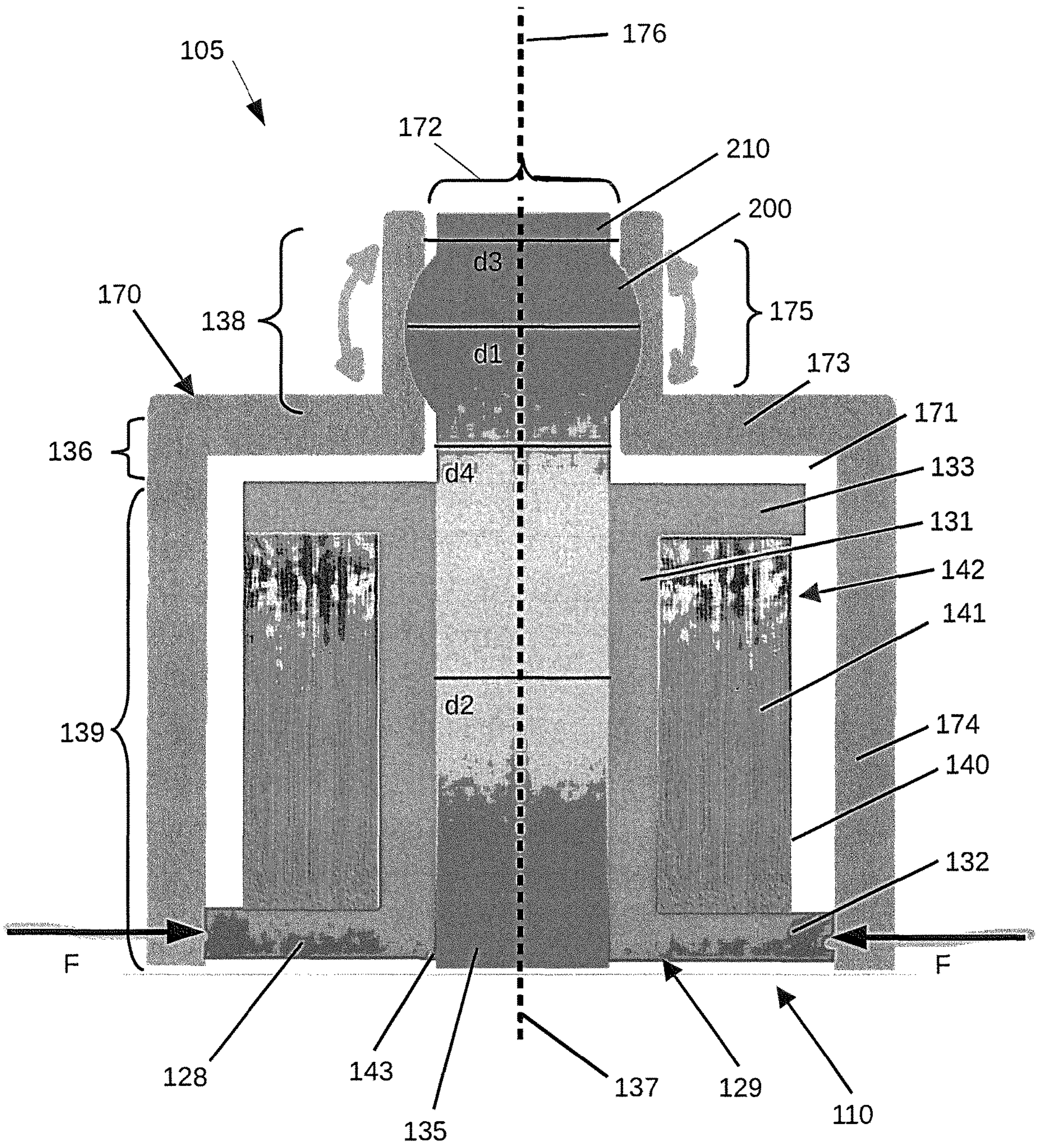
FIG. 2 shows a schematic cross-sectional view of an embodiment of an electromagnetic device according to the invention as can be used, for example, in a tilting armature valve according to FIG. 1.

FIG. 1 shows by way of FIG. 1A and FIG. 1B a simplified cross-sectional view of a tilting armature valve 100 in which an electromagnetic device according to the invention, as shown in an embodiment in FIG. 2, can be used in principle. FIG. 1 is configured to illustrate an exemplary practical use of an electromagnetic device on the basis of a tilting armature valve. The embodiment according to the invention of the magnetic core and the coil body in a housing is shown in more detail in FIG. 2 according to an exemplary embodiment and can be easily transferred by a person skilled in the art in principle to a tilting armature valve according to FIG. 1. In this context, it should be mentioned that the principal mode of operation of electromagnetic devices, such as switching devices or valve devices with an armature body as a switching element or valve element which is movable by a magnetic field, is known to a person skilled in the art.

The tilting armature valve 100 according to FIG. 1 in principle can be an exemplary embodiment of a tilting armature valve 100 shown in DE 10 2016 105 532 A1. In a variant, it can be a solenoid valve provided therein with the reference sign 100 in FIG. 1. However, other exemplary embodiments are also conceivable, namely in connection with electrical relays or solenoid valves as described in the other above-mentioned publications. Relevant embodiments of a solenoid valve described in DE 10 2016 105 532 A1 and the components thereof and the use thereof form part of the disclosure of the present invention by way of reference.

FIG. 1A shows a cross-sectional view through a tilting armature valve 100 in which the armature is in the first position. The tilting armature valve 100 has a coil element 110, an armature body (or abbreviated to armature) 115, a spring 120, a sealing element 125 and a cover shell 130. The coil element 110 comprises at least one magnetic core 135, a coil body 128 arranged circumferentially around the magnetic core 135 and a coil 140 arranged circumferentially around the coil body 128 with a package of coil windings (not explicitly shown). A front face of the armature 115 is mounted by a bearing 145. The armature 115 is movable between a first position 147 and a second position 149. The armature 115 is configured to be moved from the first position 147 into a second (attracted) position 149 when the coil 140 is activated. The armature 115 can be held in the second position 149 when the coil 140 is activated. The sealing element 125 is also arranged on the side of the armature 115 facing away from the coil element 110. A valve seat 150 with an outlet 155 and an inlet 157 for a fluid 158 is configured in the cover shell 130. The outlet 155 is closable in a fluid-tight manner by the sealing element 125 when the armature 115 is arranged in the first position 147. The sealing element 125 can also act as a damper element in order to prevent the armature 115 striking the valve seat 150. The sealing element 125 can be fastened by vulcanization to the armature 115 or a support element. It is also conceivable that when the armature 115 or sealing element 125 strikes the valve seat 150 an angle is generated by an oblique nozzle or an obliquely formed sealing element 125 or a curved armature 115. Such a nozzle, which is not explicitly shown in FIG. 1A, does not necessarily need to be integrated in the tilting armature valve 100 but can also be provided by external housing parts.

It is also conceivable that the valve seat 150 is arranged in the coil element 110 which, however, is not explicitly shown in FIG. 1A for reasons of clarity. In this case, an actuator which initiates a release of the outlet by the armature 115 might be advantageous.

In this exemplary embodiment, the armature 115 has at least one, at least partially round, elevation 160 in a bearing portion 162, wherein the elevation 160 advantageously engages in a recess 165 or opening which is arranged in a portion of a housing 170 of the tilting armature valve 100 opposing the elevation 160. As a result, after switching on a flow of current through the coil 140 the armature 115 can slide in the recess with a movement from the first position 147 into the second position 149 and at the same time is held at a fixed position in the housing 170 or relative to the cover shell 130. Advantageously, the recess is of trapezoidal configuration so that the least possible friction is caused when the elevation slides over the surface of the recess 165. The recess 165 can be manufactured, for example, from plastics material and thereby can be produced very simply and cost-effectively.

The spring 120 in this example is configured as a leaf spring and is arranged in the bearing portion on a side of the armature 115 opposing the coil 140. The spring 120 serves for pushing, without backlash, the bearing ball(s) pressed into the armature 115, for example, into the (for example trapezoidal) mating shell or recess 165 in the housing 170 of the coil element 110. The armature 115 can be fixed by the spring 120 so that the armature 115 is held by the spring 120 in a predetermined position. This provides the advantage that a uniform pretensioning force can be exerted on the armature 115 and the force exerted by the spring 120 on the armature 115 can be introduced to the armature 115 as closely as possible to a force application point located on the axis of rotation.

Alternatively, the armature 115 can be suspended on the coil element 110. In this case, the spring 120, which is configured for example as a leaf spring, could be dispensed with.

FIG. 1B shows a cross-sectional view through a tilting armature valve 100 in which the armature 115 is in the second position 149. In this case, a current through the coil 140 is switched on and the armature 115 attracted, so that a magnetic field represented by the field lines 180 is created. When the current through the coil 140 is switched off, for example, the restoring spring of the armature 115, which is shown, can drop back to the first position 147 by gravity or a spring force.

FIG. 2 shows a schematic cross-sectional view of an embodiment of an electromagnetic device according to the invention, as can be used for example in a tilting armature valve according to FIG. 1. Components which are the same, have the same function or which are similar are denoted in FIGS. 1 and 2 by the same reference signs. The armature 115 is not shown in FIG. 2 for the sake of clarity.

In contrast to the tilting armature valve 100 according to FIG. 1, the electromagnetic device 105 according to FIG. 2 has a coil element 110 in which the cylindrical magnetic core 135 in a first region 138 comprises a bulge 200, in particular a circumferential bulge, which for example has a spherical contour. In the present exemplary embodiment, the magnetic core 135 is surrounded in a second region 139 of the magnetic core 135 by the coil body 128 which may be configured rotationally symmetrically. The coil body 128 has a receiving region 142 for receiving at least one coil winding 141 of the coil 140. The coil winding 141 of the coil 140 is arranged in the receiving region 142. The bulge 200 may be integrally formed with the magnetic core 135 but in principle can, however, also be separately formed and attached to the magnetic core 135.

When viewed in cross section along the longitudinal axis 137 of the magnetic core 135, the receiving region 142 is configured by a wall 129 which has a first region 131 which runs in the direction of the longitudinal axis 137 of the magnetic core 135, a second region 132 which runs transversely (which may be perpendicularly) to the longitudinal axis 137 of the magnetic core 135 and is arranged at a first end of the first region 131, and a third region 133 which also runs transversely (which may be perpendicularly) to the longitudinal axis 137 of the magnetic core 135 and is arranged on a second end of the first region 131. The first region 131, the second region 132 and the third region 133 of the wall 129 together form a trough-like or, as shown, a U-shaped receiving region 142.

The coil body 128 has a magnetic core receiving space 143 which is configured by the first region 131 of the wall 129 of the receiving region 142. The magnetic core receiving space 143 is adapted to the magnetic core 135 such that the magnetic core 135 can be pressed into the magnetic core receiving space 143 of the coil body 128. In particular, the magnetic core receiving space 143 has a cylindrical shape.

In an exemplary embodiment, not shown, the receiving region 142 of the coil body 128 can also be configured only by the first region 131 of the wall 129 and the second region 132 of the wall 129, wherein the housing 170 (which is in particular a magnetic housing) is arranged in the vicinity of the second end of the first region 131 without the second end of the first region 131 contacting the housing 170.

The housing 170 has a rotationally symmetrical cavity, in particular with a pot-like shape, with an inner region 171 which is configured such that the coil body 128 together with the magnetic core 135 can be introduced into the housing 170. In the exemplary embodiment, the housing 170 has an opening 172 (namely in the form of a bore) in a housing base 173 into which the first region 138 of the magnetic core 135 is pressed by at least one part of the bulge 200. The central opening 172 has a longitudinal extent along the magnetic core 135 with a longitudinal axis 176. The housing 170 has a contact region 175 in which the housing 170 surrounds the first region 138 of the magnetic core 135 and at least partially contacts the bulge 200 of the magnetic core 135. Due to the manufacturing tolerances and for compensating therefor, an angular offset can be present between the longitudinal axis 137 of the magnetic core 135 and the longitudinal axis 176 of the opening 172. This angular offset can be achieved by the bulge 200 in a simple and efficient manner by the longitudinal axis 137 of the magnetic core 135 being pivoted relative to the longitudinal axis 176 of the opening 172. The aim here according to one aspect of the invention is a central orientation of the magnetic core 135 in the region of the armature body 115 (not shown) which is mounted on one side of the device 105, for example on the coil body 128. By centering the magnetic core relative to the armature 115 (and thus relative to the coil body 128 at the position of the wall region 132 of the coil body) a correct function of the solenoid valve can be ensured even under tolerance conditions.

The housing 170 has a circumferential side wall 174 which extends substantially in the longitudinal direction of the opening 172 away from the housing base 173 and thus defines the inner region 171 in the radial direction. The internal diameter of the inner region 171 may be slightly smaller than the external diameter of the coil body 128, in particular the second region 132 of the wall 129 of the coil body 128, which may have the maximum external diameter of the coil body 128, so that when the coil body 128 is pushed into the housing 170, a radial pressing (shown by the force F) is exerted on the coil body 128, in particular on the radial outer ends of the second region 132 of the wall 129 of the coil body 128. An external diameter of the third region 133 of the wall 129 may be smaller than the external diameter of the second region 132 of the wall 129 so that in the installed state the third region 133 does not contact the housing 170. An external diameter of the coil 140 is also smaller than the external diameter of the second region 132 of the wall 129 of the coil body 128. Due to the radial pressure exerted by the housing 170 onto the coil body 128, in particular onto the second region 132 of the wall 129 of the coil body 128, the magnetic core 135 is centered via the coil body 128 in the housing 170. In other words, this means that the magnetic core 135 is primarily not centered by the opening 172 in the housing 170 but in the second region 139 of the magnetic core 135, which may be by the housing 170 and the coil body 128 which is spaced apart from the opening 172 or the contact region 175 of the housing 170 in the longitudinal direction of the magnetic core 135.

Such a centering, in which the magnetic core 135 also contacts the housing 170 in the contact region 175 without a gap, is made possible by the bulge 200 which, on the one hand, permits a pivoting of the magnetic core 135 relative to the longitudinal axis 176 of the opening 172 of the housing 170, and, on the other hand, also ensures the gap-free contact with the housing 170 by its rounded shape extending beyond the magnetic core 135 in the region 139. In other words, it is possible to compensate for manufacturing deviations or tolerances of the opening 172 and/or the magnetic core 135 and/or the coil body 128 by the bulge 200 and the magnetic core 135 centered in the housing 170 without an air gap (which would be disadvantageous for the magnetic flux) being produced between the magnetic core 135 and the contact region 175 of the housing 170 inside the opening 172. The housing 170 may be configured in one piece.

The housing 170 comprises magnetic material, for example iron or other metallic material, as known to a person skilled in the art and described, for example, in DE 10 2016 105 532 A1.

According to one embodiment, the bulge 200 which is arranged on the magnetic core 135 is arranged on an outer face in the first region 138 of the magnetic core 135 so that the, in particular circumferential, bulge 200 is in contact with the contact region 175 of the housing 170 when pushed in and in the end position of the magnetic core 135. A type of flow behavior of the housing material of the housing 170 can be produced by the bulge 200 during the pressing-in, wherein the contact region 175 of the housing 170 remains in contact with the bulge 200.

When viewed in the insertion direction of the magnetic core 135 into the housing 170, initially an insertion region 210, in particular a cylindrical insertion region, which has the same or a smaller external diameter than an external diameter d2 of the second region 139 of the cylindrical magnetic core 135 is provided in the first region 138 of the magnetic core 135. This also means that the external diameter of the cylindrical insertion region 210 is smaller than an internal diameter d3 of the contact region 175 of the opening 172. This permits an easier mounting of the magnetic core 135 in the housing 170 since the magnetic core 135 can be pushed into the opening 172 even with an offset between the longitudinal axis 137 of the magnetic core 135 and the longitudinal axis 176 of the opening 172.

When viewed in the insertion direction, the bulge 200 which has a spherical contour in the exemplary embodiment follows the insertion region 210. In other words, in one embodiment the bulge 200 has a ball-shaped profile. The bulge 200 permits the magnetic core 135 to pivot (shown by the double arrow on both sides in FIG. 2) about a central point of the bulge 200 which may be located on the longitudinal axis 137. The bulge 200 has an external diameter d1 which is larger than the external diameter d2 of the second region 139 of the magnetic core. The external diameter d1 may form the maximum external diameter of the magnetic core 135.

The bulge 200 is followed in the longitudinal direction of the magnetic core 135 by a portion 136 along the longitudinal axis 137 which is located between the bulge 200 and the second region 139 of the magnetic core 135 which is surrounded by the coil body 128. In this portion 136 the magnetic core 135 contacts neither the housing 170 nor the coil body 128 (when the longitudinal axis 137 is oriented with the longitudinal axis 176, as shown in FIG. 2), i.e. a free space is present between the magnetic core 135 and the housing 170 in which the magnetic core 135 can be arranged (for example pivotably), namely for compensating for manufacturing tolerances, so that a centered orientation in the second region 139 is achieved (in particular at the position of the wall region 132 in the vicinity of the armature bearing), for example when the longitudinal axis 137 of the magnetic core 135 forms an angular offset relative to the longitudinal axis 176 of the opening 172. Thus the armature 115 which is mounted, for example, on the coil body 128 (in the region 132) or another element of the device 105 below the coil body 128 (see FIG. 1, in FIG. 2 not explicitly shown) is always oriented in a centered manner relative to the magnetic core 135 even under different manufacturing tolerances, whereby the mode of operation of the tilting armature valve 100 can also be ensured under tolerance conditions.

It is thus possible that the magnetic core 135, when placed in the opening 172, can be pivoted in the contact region 175 by this portion 136 in cooperation with the bulge 200. An external diameter d4 of the portion 136 is smaller than the external diameter d1 of the bulge 200 so that the magnetic core 135 in the portion 136 is not in contact with the housing 170. The external diameter d4 can be less than or equal to the external diameter d2 of the second region 139 of the magnetic core 135.

The portion 136 is followed by the second region 139 of the magnetic core 135 onto which the coil body 128 can be pushed.

An electromagnetic device 105 according to the invention may provide in the magnetic core 135 a bulge 200 which is configured such that a convex pressing-in zone is produced. According to the maximum possible oblique position (due to manufacturing tolerances) of the longitudinal axis 137 of the magnetic core 135 this transitions into a second region 139 of the magnetic core 135 which is reduced in diameter in comparison with the bulge 200. Due to the bulge 200, in particular the spherical shape, a type of flow behavior of the housing material is produced during the pressing-in (comparable with pressing in balls for closing bores) which reduces the pressing-in force and at the same time permits an angular offset of the longitudinal axis 176 of the opening 172 relative to the longitudinal axis 137 of the magnetic core 135. This enables the coil body 128 to apply sufficient guide force due to the pressing force F of the housing 170 in order to position the magnetic core 135 in the housing 170 without being damaged thereby.

THE LIST OF REFERENCE SIGNS IS AS FOLLOWS:

100 Tilting armature valve
105 Electromagnetic device
110 Coil element
115 Armature body
120 Spring
125 Sealing element
128 Coil body
129 Wall
130 Cover shell
131 First region
132 Second region
133 Third region
135 Magnetic core
136 Portion
137 Longitudinal axis

138 First region
139 Second region
140 Coil
141 Coil winding
142 Receiving region
143 Magnetic core receiving space
145 Bearing
147 First position
149 Second position
150 Valve seat
155 Outlet
157 Inlet
158 Fluid
160 Elevation
162 Bearing portion
165 Recess
170 Housing
171 Inner region
172 Opening
173 Housing base
174 Side wall
175 Contact region
176 Longitudinal axis
180 Field lines
200 Bulge
210 Insertion region
d1-d4 Diameter
F Force

The invention claimed is:

1. An electromagnetic device, comprising:

a magnetic core with a longitudinal axis, wherein the magnetic core has a first region and a second region;

a coil body, which is arranged circumferentially around the second region of the magnetic core and has at least one receiving region for receiving at least one coil winding of a coil; and a housing made of a magnetic material, wherein the housing at least partially circumferentially surrounds the magnetic core and the coil body and has at least one contact region in which the housing surrounds and contacts the magnetic core;

wherein the first region of the magnetic core has at least one bulge on a surface of the magnetic core facing the contact region of the housing, and the magnetic core in the region of the bulge contacts the contact region of the housing, and wherein the bulge is configured such that the magnetic core does not contact the housing in a portion along the longitudinal axis between the bulge and the second region.

2. The electromagnetic device of claim 1, wherein the housing contacts the coil body and exerts a force onto the coil body in a direction transversely to the longitudinal axis of the magnetic core.

3. The electromagnetic device of claim 2, wherein the receiving region is formed by at least one wall which has a first region which runs in the direction of the longitudinal axis of the magnetic core and at least one second region which runs transversely to the longitudinal axis of the magnetic core and the housing contacts the second region of the wall.

4. The electromagnetic device of claim 1, wherein the housing has an opening with a longitudinal extent along the magnetic core with a longitudinal axis, wherein the opening surrounds the magnetic core in the contact region of the housing and the longitudinal axis of the magnetic core is arranged with an angular offset relative to the longitudinal axis of the opening.

5. The electromagnetic device of claim 1, wherein the bulge is configured spherically on the surface of the magnetic core facing the contact region of the housing.

6. The electromagnetic device of claim 1, wherein the magnetic core is configured rotationally symmetrically in the first and second region.

7. The electromagnetic device of claim 6, wherein the bulge has a maximum external diameter which is larger than an external diameter of the magnetic core in the second region.

8. The electromagnetic device of claim 1, wherein the magnetic core is configured cylindrically in the second region.

9. The electromagnetic device of claim 1, wherein the electromagnetic device includes an electromagnetic actuator.

10. The electromagnetic device of claim 9, further comprising:

a movable magnetic armature body as a movable actuator element which can be moved by a magnetic field brought about by a flow of current through the coil and the magnetic core.

11. The electromagnetic device of claim 10, wherein the armature body is mounted on the coil body or on the housing.

12. The electromagnetic device of claim 1, wherein the electromagnetic device is configured as an electromagnetic switching device or valve device with a movable magnetic armature body as a switching element or valve element, which can be moved by a magnetic field brought about by a flow of current through the coil and the magnetic core.

13. The electromagnetic device of claim 1, wherein the electromagnetic device is configured as an electromechanical relay or solenoid valve.

14. The electromagnetic device of claim 1, wherein the electromagnetic device is configured as a solenoid valve for a pressure control module or air treatment of a vehicle.

15. A method for producing an electromagnetic device, the method comprising:

pre-mounting a coil body and a magnetic core to form an arrangement;

mounting the arrangement, having the coil body and the magnetic core, in a housing;

centering the magnetic core during the mounting of the arrangement in the housing by a pivoting movement of a first region of the magnetic core in relation to a contact region of the housing transversely to a longitudinal axis of the magnetic core; and fixing the arrangement, having the coil body and the magnetic core, in the housing;

wherein the electromagnetic device includes:

the magnetic core with a longitudinal axis, wherein the magnetic core has the first region and a second region;

the coil body, which is arranged circumferentially around the second region of the magnetic core and has at least one receiving region for receiving at least one coil winding of the coil; and the housing made of a magnetic material, wherein the housing at least partially circumferentially surrounds the magnetic core and the coil body and the contact region in which the housing surrounds and contacts the magnetic core;

wherein the first region of the magnetic core has at least one bulge on a surface of the magnetic core facing the contact region of the housing, and the magnetic core in the region of the bulge contacts the contact region of the housing, and wherein the bulge is configured such that the magnetic core does not contact the housing in a portion along the longitudinal axis between the bulge and the second region.

* * * * *